(12) United States Patent
Matsumoto

(10) Patent No.: US 8,499,705 B2
(45) Date of Patent: Aug. 6, 2013

(54) STERN STRUCTURE OF SHIP

(75) Inventor: Daisuke Matsumoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/318,373

(22) PCT Filed: Feb. 18, 2010

(86) PCT No.: PCT/JP2010/052461
§ 371 (c)(1),
(2), (4) Date: Nov. 1, 2011

(87) PCT Pub. No.: WO2011/055558
PCT Pub. Date: May 12, 2011

(65) Prior Publication Data
US 2012/0042819 A1   Feb. 23, 2012

(30) Foreign Application Priority Data
Nov. 5, 2009   (JP) .................................. 2009-254297

(51) Int. Cl.
*B63B 1/00*   (2006.01)
(52) U.S. Cl.
USPC ........... 114/57; 114/67 R; 114/61.28; 440/69; 440/66
(58) Field of Classification Search
USPC ................................................. 114/57, 65 R
See application file for complete search history.

(56) References Cited

U.S. PATENT DOCUMENTS

| | | | | | |
|---|---|---|---|---|---|
| 3,680,513 | A | * | 8/1972 | Klasic | 114/57 |
| 4,363,630 | A | * | 12/1982 | Di Vigano | 440/69 |
| 7,798,875 | B1 | * | 9/2010 | Angel et al. | 440/82 |

FOREIGN PATENT DOCUMENTS

| | | |
|---|---|---|
| JP | 47-24877 | 8/1972 |
| JP | 50-1077 | 1/1975 |
| JP | 8-150983 | 6/1996 |
| WO | 2006/095774 | 9/2006 |

OTHER PUBLICATIONS

International Search Report issued Jul. 20, 2010 in International (PCT) Application No. PCT/JP2010/052461.

\* cited by examiner

*Primary Examiner* — S. Joseph Morano
*Assistant Examiner* — Jovon Hayes
(74) *Attorney, Agent, or Firm* — Wenderoth, Lind & Ponack, L.L.P.

(57) ABSTRACT

A stern structure of a ship includes a plurality of propellers, a plurality of propeller shafts and a stern structural body. A plurality of propeller shaft tubes is provided correspondingly to the plurality of propellers, and the plurality of propeller shafts connected to the plurality of propellers is inserted into the plurality of propeller shaft tubes. The stern structural body extends backwardly from the stern body, spreads externally with respect to a ship body center line C, and contains portions of the plurality of propeller shafts extending backwardly from the stern body. An inner side of the stern structural body is equivalent to an interior portion of a ship body. The stern structural body supports the plurality of propeller shaft tubes in the interior portion of the ship body.

14 Claims, 5 Drawing Sheets

A-A'

B-B'

STERN STRUCTURE OF SHIP

TECHNICAL FIELD

The present invention relates to a stern structure of a ship.

BACKGROUND ART

As one example of a propulsion device of a ship, a single engine single screw (single engine single propeller) design and a twin engines twin screws (twin engines twin propellers) design are known. As the propulsion device of a typical merchant ship, the single engine single screw design or the twin engines twin screws design is employed in many cases. The ship that employs the former is referred to as a single-screw ship, and the ship that employs the latter is referred to as a twin-screw ship, respectively.

Also, with recently increasing the size of a ship, in the single-screw ship, there maybe problems of a decrease in a propulsion efficiency which is caused by an increase in a load of a propeller, an increase in a ship body vibration which is caused by an enlargement in a cavitation range, and generation of erosion. It is known that those problems can be solved by designing the ship as the twin-screw ship. This is because designing the twin-screw ship can decrease a propeller load per propeller, improve a propeller efficiency and decrease a cavitation generation range.

As a design in which two propellers are arranged in a stern, there are some examples such as an overlapping-propeller (OLP) design, an interlocking-propeller design, and a design in which propellers are arranged in parallel side by side in the horizontal direction. In the OLP design, two propellers are arranged such that they are shifted back and forth and a part of one propeller overlaps with a part of the other propeller when they are viewed from the stern side. By employing the OLP design, the propulsion efficiency can be improved by about 5 to 10%, as compared with the single-screw ship. Also, in the interlocking-propeller design, two propellers are arranged such that wings of one propeller are put between wings of the other propeller. In the design in which propellers are arranged in parallel side by side in the horizontal direction, two propellers are arranged side by side at the same positions in the longitudinal direction of the ship.

Here, as a positional relation between two propellers when the two propellers are arranged in a stern structure of a single-screw ship type, they are preferred to be arranged in the vicinities of the ship body center, from the viewpoint of the relation with longitudinal vortexes in the stern such as a bilge vortex and a slow flow near the ship body center line. In such a case, there are the following effects. At the stern, the longitudinal vortexes of the slow flow, such as one set of inwardly rotated bilge vortexes which are symmetrical with respect to the ship body center line, is generated at a position of a propeller in a general single-screw ship. A case in which a propeller is operated at a place where a flow is slow becomes high inefficiency, as compared with a case in which the propeller is not operated at the place. For this reason, it is possible to improve the propulsion efficiency by rotating the propellers near the longitudinal vortexes and absorbing the slow flow and the longitudinal vortexes near the ship body center line. In the case of the OLP design, in order to efficiently absorb the longitudinal vortexes near the ship body center line and improve the propulsion efficiency, as the propeller rotation direction, the outward rotation is employed in many cases.

For example, a patent literature 1 (WO2006/095774 A) describes a technique of a case in which the OLP is employed in the stern structure of the single-screw ship type. FIG. 1A and FIG. 1B are schematic views each showing a part of a structure of a stern in a twin-screw ship in the patent literature 1. Here, FIG. 1A is the diagrammatic view when the stern of the twin-screw ship is viewed from the ship bottom side, and FIG. 1B is the diagrammatic view of an A-A' section in FIG. 1A when it is viewed from the stern. A twin-screw ship 100 has a stern of a single-screw ship type and includes a starboard (right) propeller 110, a port (left) propeller 120 and a rudder 105. The starboard propeller 110 is connected to one end of a starboard propeller shaft 112 inserted into a starboard stern tube 111. The other end of the starboard propeller shaft 112 is connected to a starboard engine 131 inside the ship body. The starboard engine 131 rotates the starboard propeller 110 through the starboard propeller shaft 112. Also, the port propeller 120 is connected to one end of a port propeller shaft 122 inserted into a port stern tube 121, similarly to the starboard propeller 110. The other end of the port propeller shaft 122 is connected to a port engine 132 inside the ship body. The port engine 132 rotates the port propeller 120 through the port propeller shaft 122. Also, in an interval between the starboard stern tube 111 and a stern body 103, they are joined through a bracket fin 109, and an interval between the port stern tube 121 and the stern body 103, they are joined through a bracket fin 108. Also, the rudder 105 is provided on a ship body center line C, at the back of the starboard propeller 110 and the port propeller 120.

However, the inventor has now discovered the following facts from the research.

When the OLP is employed and the center portion of the stern is made thin to make the propeller shafts close thereto for efficiently absorbing the longitudinal vortexes near the ship body center line, the structure for supporting the propeller shafts cannot have enough the strength. For this reason, in the foregoing patent literature 1, the bracket fins 109 and 108 are provided for the sake of reinforcement. However, there may be a possibility that only the bracket fins 109 and 108 are not enough to compensate for the strength poverty. Also, there may be a possibility that the propulsion efficiency is decreased due to the bracket fins' 109 and 108 own resistances.

Moreover, a method is considered which compensates for the strength poverty by using bossings without using the bracket fins. However, the length of the bossing becomes long. Thus, also in this case, there may be a possibility that the propulsion efficiency is decreased due to the bossings' own resistances. In this way, when an appendage such as the shaft bracket and the bossing is provided in order to improve the strength of the supporting structure of the propeller shaft in the twin-screw ship, there is a possibility that the propulsion performance is made worse in association with the increase of the appendage resistance caused by them.

Citation List

Patent Literature
[PTL 1] WO2006/095774A

SUMMARY OF INVENTION

An object of the present invention is to provide a stern structure of a ship, which can improve a propulsion efficiency while reinforcing a supporting structure of a propeller shaft and also suppressing a appendage resistance increase caused by an appendage such as a bossing and a bracket fin, and a ship using the same.

A stern structure of a ship in the present invention includes a plurality of propellers, a plurality of propeller shafts and a stern structural body. The plurality of propeller shafts is provided correspondingly to the plurality of propellers and is connected to the plurality of propellers. The stern structural body is provided so as to be joined to a rear part of a stern body, and contains portions of the plurality of propeller shafts extending backwardly from the stern body. An inner side of the stern structural body is equivalent to an interior portion of a ship body. The stern structural body supports the plurality of propeller shafts in the interior portion of the ship body.

In the stern structure of the ship as mentioned above, the stern structural body includes a top surface portion, a bottom surface portion and a side portion. The top surface portion is provided to extend backwardly from the stern body, to spread externally with respect to the ship body center line and to cover an above portion of the propeller shaft. The bottom surface portion is provided to extend backwardly from the stern body, to spread externally with respect to the ship body center line and to cover a below portion of the propeller shaft. The side portion is provided to extend backwardly from the stern body, to be joined to the top surface portion and the bottom surface portion and to cover a side portion of the propeller shaft.

In the stern structure of the ship as mentioned above, the top surface portion includes a first curvature portion which configures a curvature such that the stern body and the side portion are continuously and smoothly joined on a top side. The bottom surface portion includes a second curvature which configures a curvature such that the stern body and the side portion are continuously and smoothly joined on a bottom side.

In the stern structure of the ship as mentioned above, the top surface portion includes a first flat portion which configures a flat plane such that the stern body and the side portion are continuously joined on a top side. The bottom surface portion includes a second flat portion which configures a flat plane such that the stern body and the side portion are continuously joined on a bottom side.

A stern structure of a ship in the present invention includes a plurality of propellers, a plurality of propeller shaft tubes and a stern structural body. The plurality of propeller shaft tubes is provided correspondingly to the plurality of propellers, a plurality of propeller shafts connected to the plurality of propellers being inserted into the plurality of propeller shaft tubes. The stern structural body is provided so as to be joined to a rear part of a stern body, and supports portions of the plurality of propeller shafts tubes extending backwardly from the stern body. The stern structural body includes a side fin and an upper fin. The side fin extends backwardly from the stern body, spreads externally with respect to the ship body center line and is joined to side portions of the plurality of propeller shaft tubes to support the plurality of propeller shaft tubes. The upper fin is provided separately at a rear of the stern body, and extends downwardly from a bottom of the stern body and is joined to upper portions of the plurality of propeller shaft tubes to support the plurality of propeller shaft tubes. The side fin and the upper fin are joined to the stern body to coincide with directions of stream lines around the ship body.

In the stern structure of the ship as mentioned above, the stern body has a stern structure of a single-screw ship type.

A ship of the present invention is a ship which has the stern structure of the ship which is described in any one of the above-mentioned respective paragraphs.

According to the present invention, it is possible to provide the stern structure which can improves the propulsion efficiency while reinforcing the supporting structure of the propeller shaft and also suppressing the resistance increase caused by the appendage such as the bracket fin in the ship.

DESCRIPTION OF EMBODIMENTS

Embodiments of a stern structure of the present invention and a ship using the same will be described below with reference to the attached drawings.

(First Embodiment)

Figure 2A:
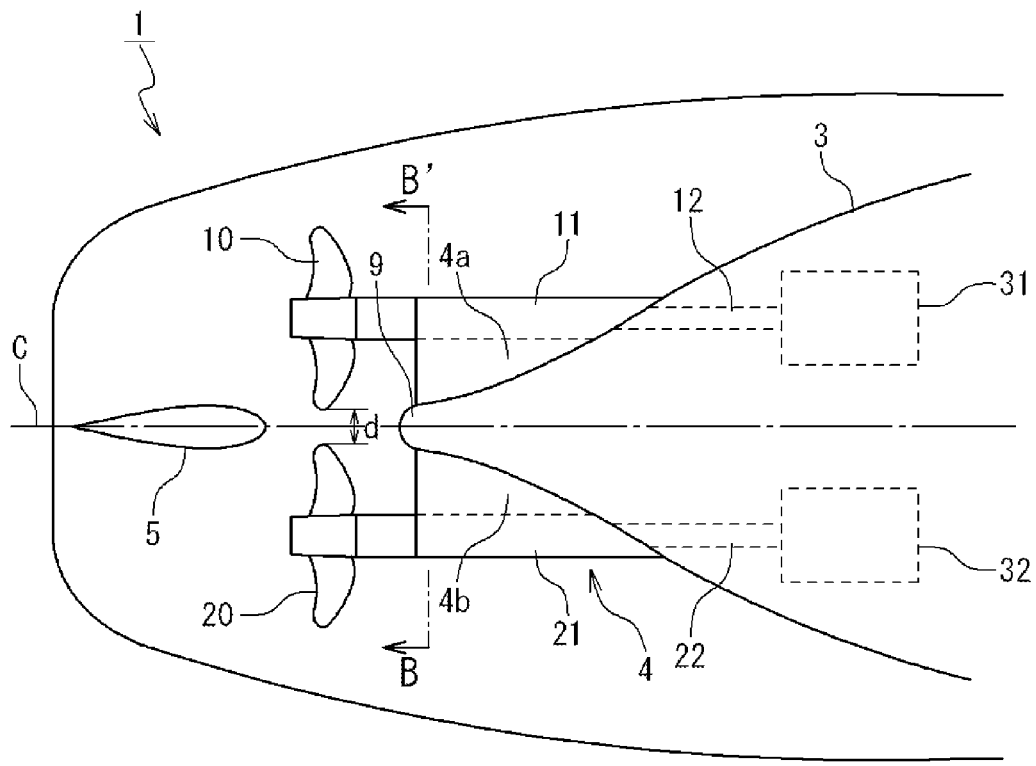
FIG. 2A is a schematic view showing a configuration of a part of a stern structure of a ship according to a first embodiment of the present invention.
Figure 2B:
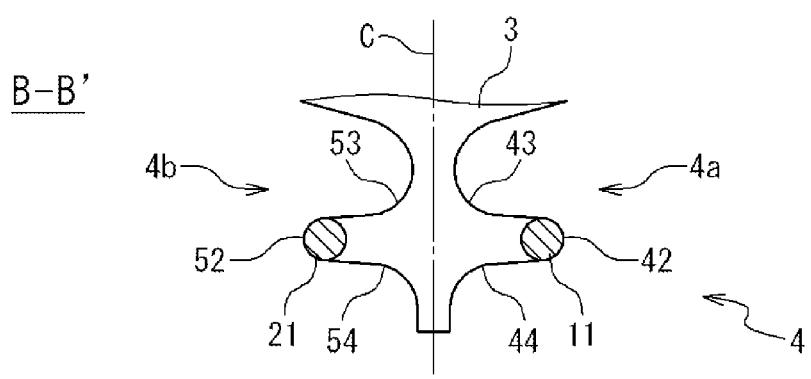
FIG. 2B is a schematic view showing a configuration of a part of the stern structure of the ship according to the first embodiment of the present invention.

At first, a configuration of a stern structure of a ship according to the first embodiment of the present invention will be described. FIG. 2A and FIG. 2B are schematic views each showing a configuration of a part of the stern structure of the ship according to the first embodiment in the present invention. Here, FIG. 2A is a schematic view when the stern structure of the ship is viewed from the ship bottom side, and FIG. 2B is a schematic view of a B-B' section when it is viewed from the stern side of FIG. 2A. Here, as the ship, a twin-screw ship 1 is exemplified, which has a stern structure of a single-screw ship type included in a group of a multi-propeller-ship. As shown in FIG. 2A, the twin-screw ship 1 includes a stern structural body 4, a starboard propeller 10, a starboard propeller shaft tube 11, a port propeller 20, a port propeller shaft tube 21 and a rudder 5.

The starboard propeller 10 is provided on the right side of a stern body 3 located in the lower portion of the stern in the ship body. The starboard propeller 10 is connected to one end of a starboard propeller shaft 12 inserted into the starboard propeller shaft tube 11. The other end of the starboard propeller shaft 12 is connected to a starboard engine 31 inside the ship body. The starboard engine 31 rotates the starboard propeller 10 through the starboard propeller shaft 12. Also, similarly, the port propeller 20 is provided on the left side of the stern body 3 in the stern. The port propeller 20 is connected to one end of a port propeller shaft 22 inserted into the port propeller shaft tube 21. The other end of the port propeller shaft 22 is connected to a port engine 32 inside the ship body. The port engine 32 rotates the port propeller 20 through the port propeller shaft 22. The respective propeller shafts 22 and 12 are rotatably held by the port and starboard propeller shaft tubes 21 and 11 and bearings inside respective stern structure bodies 4b and 4a.

However, the starboard propeller shaft tube 11 and the port propeller shaft tube 21 are outer cylinders (tubes) for protecting the starboard propeller shaft 12 and the port propeller shaft 22, respectively, and they are exemplified as stern tubes. However, they are not limited thereto, and any shapes are allowable.

Figure 1A:
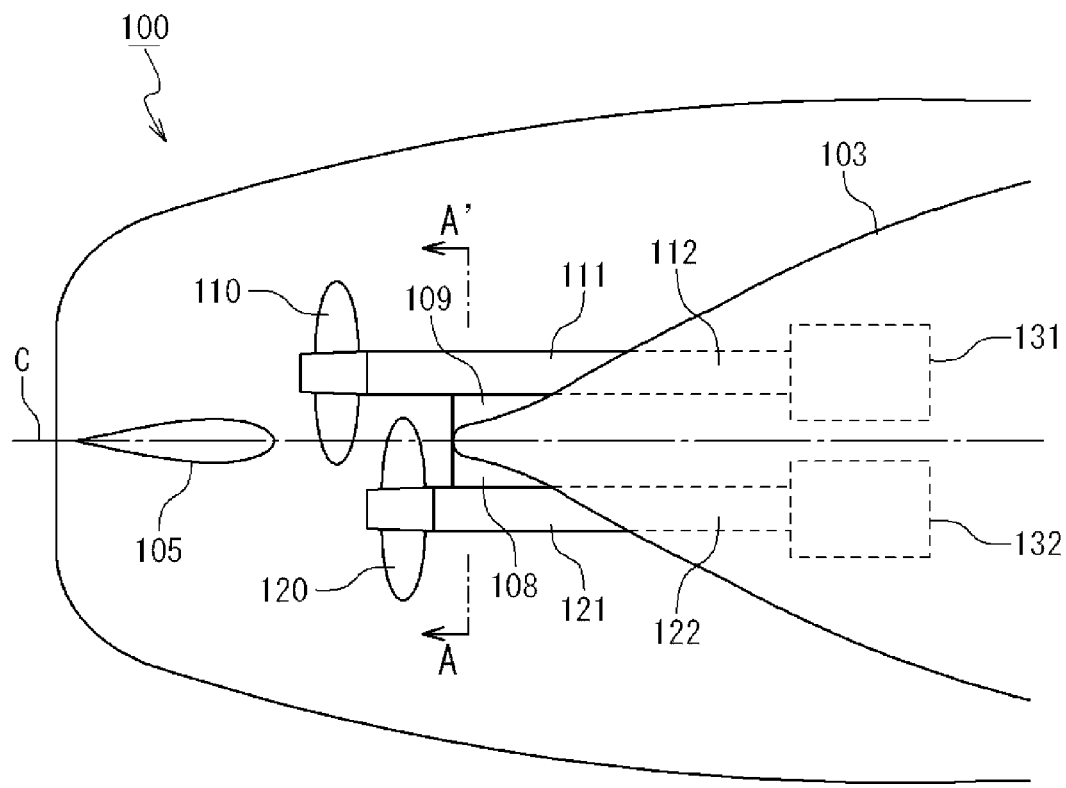
FIG. 1A is a schematic view showing a part of a structure of a stern of a twin-screw ship in the patent literature 1.
Figure 1B:
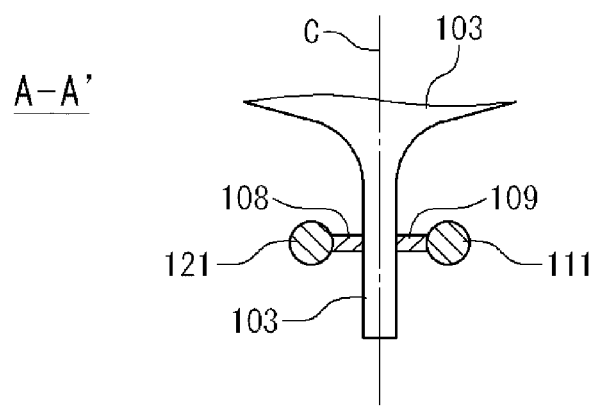
FIG. 1B is a schematic view showing a part of the structure of the stern of the twin-screw ship in the patent literature 1.

The stern structural body 4 extends from the stern body 3 to the rear of the ship body, spreads externally with respect to a ship body center line C and contains therein portions where parts of the starboard propeller shaft tube 11 and the port propeller shaft tube 21 protrude (extend backwardly) from the stern body 3. Then, the stern structural body 4 is joined to the stern body 3 to form a part of the ship body of the twin-screw ship 1. That is, the starboard propeller shaft tube 11 is taken in the interior portion of the ship body (the interior portion of the stern structural body 4 (4a)), to the vicinity of the starboard propeller 10, as compared with the case of FIG. 1A. Similarly, the port propeller shaft tube 21 is taken in the interior portion of the ship body (the interior portion of the stern structural body 4 (4b)), to the vicinity of the port propeller 20, as compared with the case of FIG. 1A. Then, the stern structural body 4 extends from the positions at which the starboard propeller shaft tube 11 and the port propeller shaft tube 21 protrude from the stern body 3, to the vicinity of the tip of a skeg 9 in the stern direction on the bottom of the stern body 3.

Here, the stern body 3 indicates the portion that has the structure similar to the stern structure in the single-screw ship having the skeg along the ship body center line. Then, the stern of the twin-screw ship 1 in this embodiment is configured such that the stern body 3 and the stern structural body 4 are integrated. Hereinafter, this is the same in this specification.

The rudder 5 is provided on the ship body center line C, at the rear of the starboard propeller 10 and the port propeller 20.

The port and starboard propellers 20 and 10 are arranged side by side symmetrically with respect to the ship body center line C, at an interval distanced between propeller tips so that the propeller blades do not interfere with each other, and they are arranged in the vicinities of the ship body center line C. Here, the interval distance d between the propeller tips is preferred to be made close to the ship body center line C so that there is no concern of the contact between the propeller blades and also the flow with a low speed can be taken. Also, when the OLP design is employed, cavitation caused by a front side propeller severely influences a back side propeller. Thus, both propellers are preferred not to overlap with each other. That is, it is further preferable for d to be $0 \leq d \leq 0.5$ Dp (Dp: a propeller diameter). In this way, in the twin-screw ship, the propellers are preferably used with being made close to each other.

As shown in FIG. 2B, the stern structural body 4 includes a starboard stern structural body 4a and a port stern structural body 4b.

The starboard stern structural body 4a is composed of curvature portions 42, 43 and 44. The curvature portion 42 is provided along the exterior (exterior when it is viewed from the ship body center line C) of the starboard propeller shaft tube 11 which protrudes backwardly from the stern body 3. Consequently, the exterior portion of the starboard propeller shaft tube 11 is covered with the curvature portion 42, within a predetermined distance from the location where the starboard propeller shaft tube 11 protrudes from the stern body 3 (e.g., to the vicinity of the tip on the stern side of the skeg 9). One end of the curvature portion 43 is joined to the upper portion of the skeg 9 extending downwardly from the stern body 3, and the other end is joined to the upper portion of the curvature portion 42. Consequently, the upper side of the starboard propeller shaft tube 11 is covered with the curvature portion 43, within the predetermined distance from the portion where the starboard propeller shaft tube 11 protrudes from the stern body 3. One end of the curvature portion 44 is joined to the lower portion of the skeg 9 extending downwardly from the stern body 3, and the other end is joined to the lower portion of the curvature portion 42. Consequently, the lower side of the starboard propeller shaft tube 11 is covered with the curvature portion 44, within the predetermined distance from the location where the starboard propeller shaft tube 11 protrudes from the stern body 3. That is, with the curvature formed by those curvature portions 42, 43 and 44, the starboard propeller shaft tube 11 is enclosed inside the ship body of the twin-screw ship 1.

Similarly, the port stern structural body 4b is composed of curvature portions 52, 53 and 54. The curvature portion 52 is provided along the exterior (exterior when it is viewed from the ship body center line C) of the port propeller shaft tube 21 which protrudes backwardly from the stern body 3. Consequently, the exterior portion of the port propeller shaft tube 21 is covered with the curvature portion 52, within the predetermined distance from the location where the port propeller shaft tube 21 protrudes from the stern body 3 (e.g., to the vicinity of the tip on the stern side of the skeg 9). One end of the curvature portion 53 is joined to the upper portion of the skeg 9 extending downwardly from the stern body 3, and the other end is joined to the upper portion of the curvature portion 52. Consequently, the upper side of the port propeller shaft tube 21 is covered with the curvature portion 53, within the predetermined distance from the location where the port propeller shaft tube 21 protrudes from the stern body 3. One end of the curvature portion 54 is joined to the lower portion of the skeg 9 extending downwardly from the stern body 3, and the other end is joined to the lower portion of the curvature portion 52. Consequently, the lower side of the port propeller shaft tube 21 is covered with the curvature portion 54, within the predetermined distance from the location where the port propeller shaft tube 21 protrudes from the stern body 3. That is, with the curvature formed by those curvature portions 52, 53 and 54, the port propeller shaft tube 21 is enclosed inside the ship body of the twin-screw ship 1.

The starboard stern structural body 4a and the port stern structural body 4b are symmetrical with respect to the ship body center line C. The starboard stern structural body 4a and the port stern structural body 4b composed of, for example, the same steel sheet as the stern body 3 are continuously joined (e.g., joined by welding) to the ship body to constitute the part of the ship body of the twin-screw ship 1. Consequently, both of the port and starboard propeller shaft tubes 21 and 11, which protrude to the exterior of the stern body 3, are taken into the interior portion of the ship body, to the vicinities of both of the port and starboard propellers 20 and 10. In this way, both of the port and starboard propellers 20 and 10 can be arranged inside the ship and integrated with the stern structure. Consequently, the starboard stern structural body 4a and the port stern structural body 4b can be formed in small shapes without being formed in thick protrusive shapes like appendages such as a bossing, and the support strength can be improved. That is, it is possible to decrease appendages in the ship body, to suppress the resistance increase caused thereby and to improve the propulsion efficiency.

The curvature portions 43 and 44 and the curvature portions 53 and 54 are joined to the stern body 3 smoothly having a curve (curvature) represented by a continuous function so that the influence on the propulsion efficiency of the ship can be reduced. The shape is not limited to the shape in FIG. 2B. If the shape leads to the reduction of the influence on the propulsion efficiency of the ship, the shape is not especially limited. Also, the curvature portions 42 and 52 may be jointly used as the members for both of the starboard and port propeller shaft tubes 11 and 21. Also, the curvature portion 42 may be taken into one or both of the curvature portions 43 and 44 and be integrated with them. Moreover, the curvature portions 42, 43 and 44 may be integrated. Similarly, the curvature portion 52 may be taken into one or both of the curvature portions 53 and 54 and be integrated with them. Moreover, the curvature portions 52, 53 and 54 may be integrated. Also, inside both of the port and starboard stern structure bodies 4b and 4a, there may not be both of the port and starboard propeller shaft tubes 21 and 11, and both of the port and starboard propeller shafts 22 and 12 maybe exposed. In that case, the respective propeller shafts 22 and 12 are rotatably held by the bearings inside the respective stern structure bodies 4b and 4a.

As mentioned above, in the stern structure of the ship and the ship using the same according to the present embodiment, by joining both of the port and starboard propeller shaft tubes 21 and 11 and the stern body 3 through the stern structural body 4 or covering both of the port and starboard propeller shaft tubes 21 and 11 with the stern structural body 4, it is possible to arrange both of the port and starboard propeller shaft tubes 21 and 11, which protrude outside the ship body, inside the ship body. Consequently, it is possible to strongly support both of the port and starboard propeller shaft tubes 21 and 11. That is, it is possible to greatly increase the strengths of the supporting structures thereof.

Also, since the stern structural body 4 and the stern body 3 are smoothly joined, the resistance increase and the separation flow caused by both of the port and starboard propeller shaft tubes 21 and 11 can be prevented, thereby improving the propulsion efficiency. Moreover, since a part of each of the port and starboard propeller shaft tubes 21 and 11, which protrudes outside the ship body, is taken into the ship body, the length of the propeller shaft tube protruding outside the ship body is made short. Consequently, it is not necessary to use appendages such as a bracket fin and a bossing. Thus, it is possible to make the weight light, to avoid the resistance increase and the flow separation and consequently to improve the propulsion efficiency.

Figure 3:
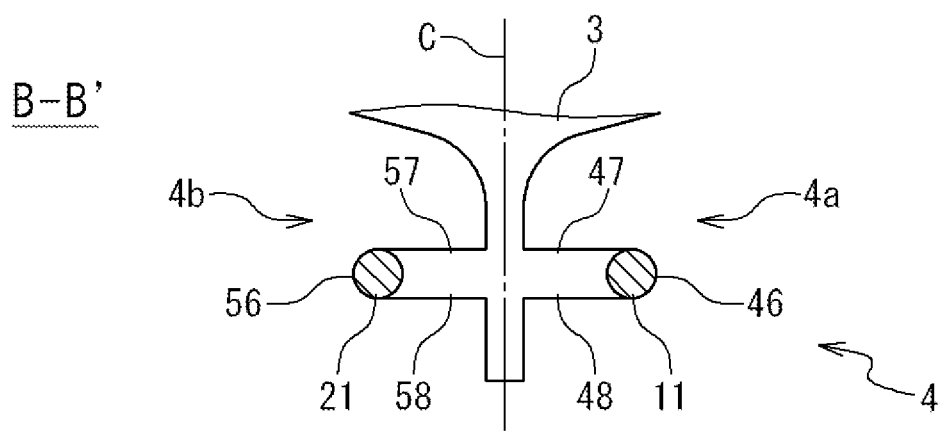
FIG. 3 is a schematic view showing a configuration of a variation example of a part of the stern structure of the ship according to the first embodiment of the present invention.

FIG. 3 is a schematic view showing a configuration of a part of a variation example of the stern structure of the ship in the first embodiment of the present invention. FIG. 3 is a schematic view of the B-B' section when it is viewed from the stern in FIG. 2A. The stern structural body 4 in FIG. 3 includes the starboard stern structural body 4a and the port stern structural body 4b.

The starboard stern structural body 4a is composed of a curvature portion 46 and flat portions 47 and 48. The curvature portion 46 is provided along the exterior (exterior when it is viewed from the ship body center line C) of the starboard propeller shaft tube 11 which protrudes backwardly from the stern body 3. Consequently, the exterior portion of the starboard propeller shaft tube 11 is covered with the curvature portion 46, within the predetermined distance from the location where the starboard propeller shaft tube 11 protrudes from the stern body 3. One end of the flat portion 47 is joined to the upper portion of the skeg 9 extending downwardly from the stern body 3, and the other end is joined to the upper portion of the curvature portion 46. Consequently, the upper side of the starboard propeller shaft tube 11 is covered with the flat portion 47, within the predetermined distance from the location where the starboard propeller shaft tube 11 protrudes from the stern body 3. One end of the flat portion 48 is joined to the lower portion of the skeg 9 extending downwardly from the stern body 3, and the other end is joined to the lower portion of the curvature portion 46. Consequently, the lower side of the starboard propeller shaft tube 11 is covered with the flat portion 48, at the predetermined distance from the location where the starboard propeller shaft tube 11 protrudes from the stern body 3. That is, with the curvature formed of the curvature portion 46 and the flat planes formed of the flat portions 47 and 48, the starboard propeller shaft tube 11 is enclosed inside the ship body of the twin-screw ship 1.

Similarly, the port stern structural body 4b is composed of a curvature portion 56 and flat portions 57 and 58. The curvature portion 56 is provided along the exterior (exterior when it is viewed from the ship body center line C) of the port propeller shaft tube 21 which protrudes backwardly from the stern body 3. Consequently, the exterior portion of the port propeller shaft tube 21 is covered with the curvature portion 56, within the predetermined distance from the location where the port propeller shaft tube 21 protrudes from the stern body 3. One end of the flat portion 57 is joined to the upper portion of the skeg 9 extending downwardly from the stern body 3, and the other end is joined to the upper portion of the curvature portion 56. Consequently, the upper side of the port propeller shaft tube 21 is covered with the flat portion 57, within the predetermined distance from the location where the port propeller shaft tube 21 protrudes from the stern body 3. One end of the flat portion 58 is joined to the lower portion of the skeg 9 extending downwardly from the stern body 3, and the other end is joined to the lower portion of the curvature portion 56. Consequently, the lower side of the port propeller shaft tube 21 is covered with the flat portion 58, within the predetermined distance from the location where the port propeller shaft tube 21 protrudes from the stern body 3. That is, with the curvature formed of the curvature portion 56 and the flat planes formed of the flat portions 57 and 58, the port propeller shaft tube 21 is enclosed inside the ship body of the twin-screw ship 1.

The starboard stern structural body 4a and the port stern structural body 4b are symmetrical with respect to the ship body center line C. The starboard stern structural body 4a and the port stern structural body 4b composed of, for example, the same steel sheet as the stern body 3 are continuously joined (e.g., joined by welding) to the ship body to constitute the part of the ship body of the twin-screw ship 1. Consequently, both of the port and starboard propeller shaft tubes 21 and 11, which protrude to the exterior of the ship body, are taken into the interior portion of the ship body, to the vicinities of both of the port and starboard propellers 20 and 10. In this way, both of the port and starboard propellers 20 and 10 can be arranged inside the ship and integrated with the stern structure. Consequently, the starboard stern structural body 4a and the port stern structural body 4b can be formed in small shapes without being formed in thick protrusive shapes like appendages such as a bossing, and the support strength can be improved. That is, it is possible to decrease appendages in the ship body, to suppress the resistance increase caused thereby and to improve the propulsion efficiency.

The curvature portions 46 and 56 may be jointly used as the members for both of the starboard and port propeller shaft tubes 11 and 21. Also, the curvature portion 46 may be taken into one or both of the flat portions 47 and 48 and be integrated with them. Moreover, the curvature portion 46 and the flat portions 47 and 48 may be integrated. Similarly, the curvature portion 56 may be taken into one or both of the flat portions 57 and 58 and be integrated with them. Moreover, the curvature portion 56 and the flat portions 57 and 58 may be integrated.

As mentioned above, in the stern structure of the ship and the ship using the same according to the present embodiment, also in this case, it is possible to obtain the effects similar to the cases of FIGS. 2A and 2B. Also, in addition, since the curvature shapes such as the curvature portions 43, 44, 53 and 54 in the stern structural body 4 are not used, it is not necessary to bend a plate. Thus, the manufacturing process can be made easy.

The stern structural body 4 in FIG. 2B and the stern structural body 4 in FIG. 3 as mentioned above can be used while they are combined. This is such a case that, for example, in the stern structural body 4, the upper side is assumed to serve as the flat-shaped flat portions 57 and 47 and then the lower side is assumed to serve as the curvature portions 44 and 54, or a case opposite thereto. Also, in this case, it is possible to obtain the effects similar to the foregoing cases.

(Second Embodiment)

Figure 4A:
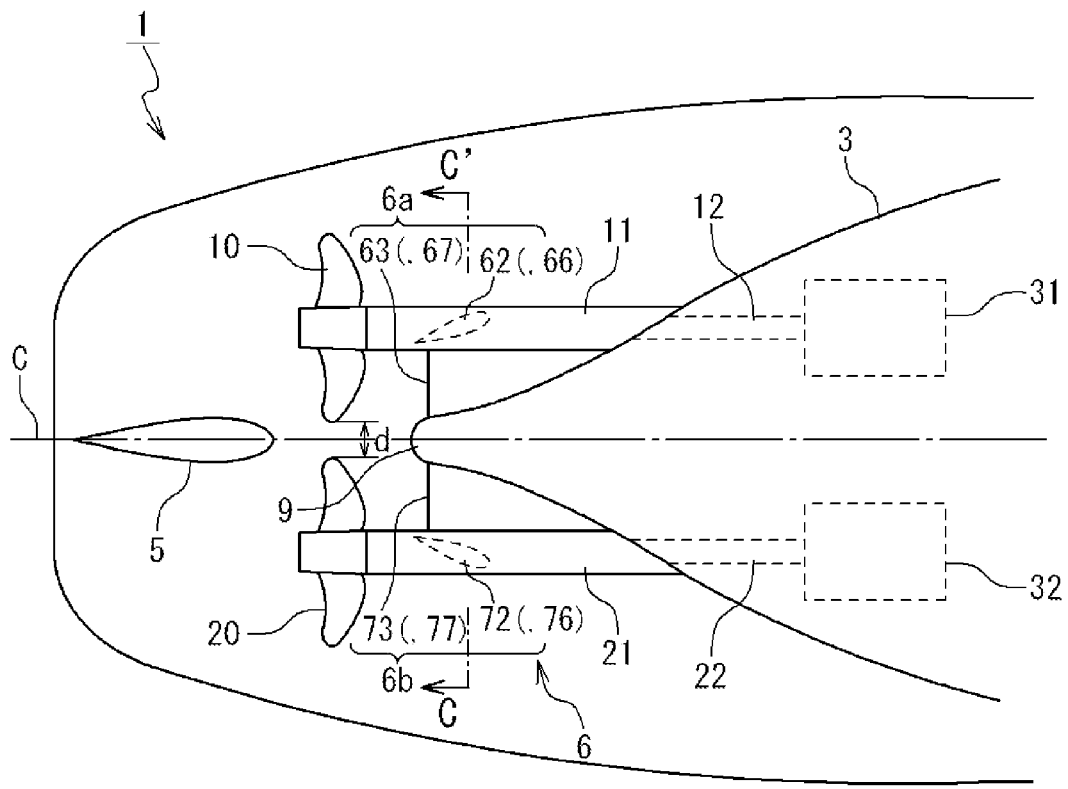
FIG. 4A is a schematic view showing a configuration of a part of a stern structure of a ship according to a second embodiment of the present invention.
Figure 4B:
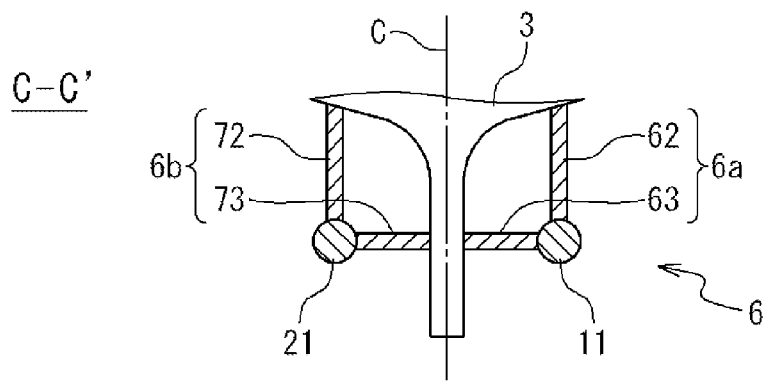
FIG. 4B is a schematic view showing a configuration of a part of the stern structure of the ship according to the second embodiment of the present invention.

At first, a configuration of a stern structure of a ship according to the second embodiment of the present invention will be described. FIG. 4A and FIG. 4B are schematic views each showing a configuration of a part of the stern structure of the ship according to the second embodiment in the present invention. Here, FIG. 4A is a schematic view when the stern structure of the ship is viewed from the ship bottom side, and FIG. 4B is a schematic view of a C-C' section when it is viewed from the stern of FIG. 4A. Here, as the ship, a twin-screw ship 1 is exemplified, which has a stern structure of a single-screw ship type included in a group of a multi-propeller-ship. As shown in FIG. 4A, the twin-screw ship 1 includes a stern structure body 6, a starboard propeller 10, a starboard propeller shaft tube 11, a port propeller 20, a port propeller shaft tube 21 and a rudder 5.

The starboard propeller 10, the port propeller 20 and the rudder 5 are similar to those of the first embodiment. Thus, their descriptions are omitted.

The stern structure body 6 includes bracket fins (62 and 63, 72 and 73), which extend backwardly from the stern body 3, spread parallel or externally to the ship body center line C from the stern body 3 and are joined (e.g., joined by welding) to portions where a part of the starboard propeller shaft tube 11 and a part of the port propeller shaft tube 21 protrude (extend backwardly) from the stern body 3. That is, as compared with the case of FIG. 1A, the bracket fins in the present embodiment is different from those of FIG. 1A in the number of bracket fins and the configuration thereof.

The stern structure body 6 includes a starboard stern structure body 6a and a port stern structure body 6b. The starboard stern structure body 6a and the port stern structure body 6b are provided symmetrically with respect to the ship body center line C. Each of the port and starboard stern structure bodies 6b and 6a are configured such that a plurality of bracket fins are combined.

The starboard stern structure body 6a includes the starboard upper bracket fin 62 and the starboard side bracket fin 63. The starboard upper bracket fin 62 is provided approximately parallel to the ship body center line C (the skeg 9 extending downwardly from the stern body 3), and one end is joined to the starboard propeller shaft tube 11, and the other end is joined to the bottom surface portion of the stern body 3, respectively. The starboard upper bracket fin 62 has a predetermined length from a middle position of the starboard propeller shaft tube 11 (e.g., to the vicinity of the tip on the stern side of the skeg 9). Also, the starboard side bracket fin 63 is provided approximately vertical to the ship body center line C (the skeg 9 of the stern body 3), and one end is joined to the starboard propeller shaft tube 11, and the other end is joined to the skeg 9 of the stern body 3, respectively. The starboard side bracket fin 63 extends within the predetermined distance from a location where the starboard propeller shaft tube 11 protrudes from the stern body 3 (e.g., to the vicinity of the tip on the stern side of the skeg 9). The starboard propeller shaft tube 11 is supported by the starboard upper bracket fin 62 and the starboard side bracket fin 63.

The port stern structure body 6b includes the port upper bracket fin 72 and the port side bracket fin 73. The port upper bracket fin 72 is provided approximately parallel to the ship body center line C (the skeg 9 of the stern body 3), and one end is joined to the port propeller shaft tube 21, and the other end is joined to the bottom surface portion of the stern body 3, respectively. The port upper bracket fin 72 has the predetermined length from the middle position of the port propeller shaft tube 21 (e.g., to the vicinity of the tip on the stern side of the skeg 9). Also, the port side bracket fin 73 is provided approximately vertical to the ship body center line C (the skeg 9 of the stern body 3), and one end is joined to the port propeller shaft tube 21, and the other end is joined to the skeg 9 of the stern body 3, respectively. The port side bracket fin 73 extends within the predetermined distance from a location where the port propeller shaft tube 21 protrudes from the stern body 3 (e.g., to the vicinity of the tip on the stern side of the skeg 9). The port propeller shaft tube 21 is supported by the port upper bracket fin 72 and the port side bracket fin 73.

As mentioned above, in the stern structure of the ship and the ship using the same according to the present embodiment, the plurality of bracket fins 72 and 73/62 and 63 are used to join the port and starboard propeller shaft tubes 21 and 11 and the stern body 3. Thus, it is possible to increase the strength of the supporting structure of the port and starboard propeller shaft tubes 21 and 11.

In addition, it is preferable that the attachment angles of the plurality of bracket fins 72 and 73/62 and 63 approximately coincide with directions of streamlines around the stern body 3. Consequently, the resistance deterioration caused by the plurality of bracket fins 72 and 73/62 and 63 can be suppressed to the minimum.

Also, in the large ship such as an oil tanker and a bulk carrier, the flow around the stern body 3 is slow. Thus, the resistance deterioration caused by the plurality of bracket fins 72 and 73/62 and 63 becomes relatively small . In that case, the angles of the plurality of bracket fins 72 and 73/62 and 63 are adjusted to directions in which the bilge vortexes are increased, namely, directions in which the respective forward flows of the port and starboard propellers 20 and 10 become the directions opposite to the rotation directions of the respective propellers (the twisted directions). Thus, it is possible to improve the propeller efficiency and improve the propulsion performance.

Figure 5:
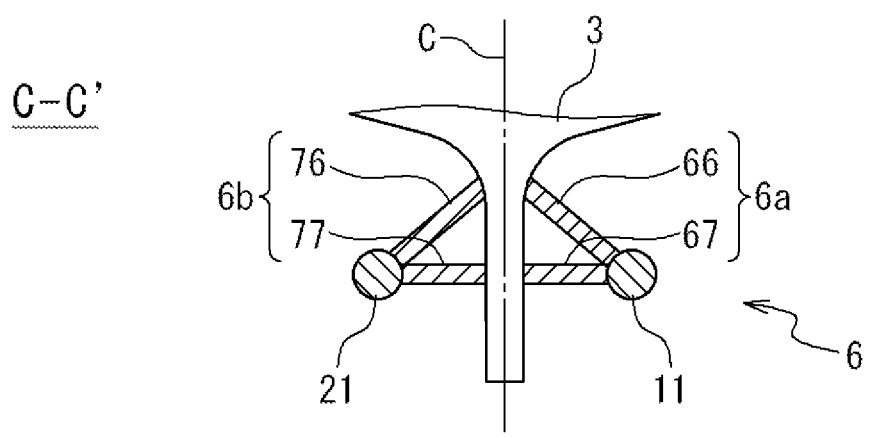
FIG. 5 is a schematic view showing a configuration of a variation example of a part of the stern structure of the ship in the second embodiment of the present invention.

FIG. 5 is a schematic view showing a configuration of a part of a variation example of the stern structure of the ship in the second embodiment of the present invention. FIG. 5 is the schematic view of the C-C' section when it is viewed from the stern in FIG. 4A. The stern structure body 6 in FIG. 5 includes the starboard stern structure body 6a and the port stern structure body 6b. The starboard stern structure body 6a and the port stern structure body 6b are provided symmetrically with respect to the ship body center line C. Each of the port and starboard stern structure bodies 6b and 6a are configured such that the plurality of bracket fins is combined.

The starboard stern structure body 6a includes a starboard upper bracket fin 66 and a starboard side bracket fin 67. The starboard upper bracket fin 66 is provided such that it is inclined toward the ship body center line C (the skeg 9 extending downwardly from the stern body 3), and one end is joined to the starboard propeller shaft tube 11, and the other end is joined to the upper portion of the skeg 9 in the stern body 3, respectively. The starboard upper bracket fin 66 has a predetermined length from the middle position of the starboard propeller shaft tube 11 (e.g., to the vicinity of the tip on the stern side of the skeg 9). Also, the starboard side bracket fin 67 is provided approximately vertical to the ship body center line C (the skeg 9 of the stern body 3), and one end is joined to the starboard propeller shaft tube 11, and the other end is joined to the lower portion of the skeg 9 of the stern body 3, respectively. The starboard side bracket fin 67 extends within the predetermined distance from the location where the starboard propeller shaft tube 11 protrudes from the stern body 3 (e.g., the vicinity of the tip on the stern side of the skeg 9). The starboard propeller shaft tube 11 is supported by the starboard upper bracket fin 66 and the starboard side bracket fin 67.

The port stern structure body 6b includes a port upper bracket fin 76 and a port side bracket fin 77. The port upper bracket fin 76 is provided such that it is inclined toward the ship body center line C (the skeg 9 of the stern body 3), and one end is joined to the port propeller shaft tube 21, and the other end is joined to the upper portion of the skeg 9 in the stern body 3, respectively. The port upper bracket fin 76 has a predetermined length from the middle position of the port propeller shaft tube 21 (e.g., to the vicinity of the tip on the stern side of the skeg 9). Also, the port side bracket fin 77 is provided approximately vertical to the ship body center line C (the skeg 9 of the stern body 3), and one end is joined to the port propeller shaft tube 21, and the other end is joined to the lower portion of the skeg 9 of the stern body 3, respectively. The port side bracket fin 77 extends within the predetermined distance from the location where the port propeller shaft tube 21 protrudes from the stern body 3 (e.g., to the vicinity of the tip on the stern side of the skeg 9). The port propeller shaft tube 21 is supported by the port upper bracket fin 76 and the port side bracket fin 77.

As mentioned above, in the stern structure of the ship and the ship using the same according to this embodiment, also in this case, it is possible to obtain the effects similar to the cases of FIG. 4A and FIG. 4B. Here, also in this case, it is preferable that the attachment angles of the respective bracket fins in the stern structure body 6 approximately coincide with directions of stream lines around the stern body 3. Also in this case, it is possible to obtain the effects similar to the cases of FIG. 4A and FIG. 4B.

It is apparent that the present invention is not limited to the above embodiment, but may be modified and changed without departing from the scope and spirit of the invention. For example, the OLP and the interlock propeller can be also employed for the arrangement of the propellers. Also in that case, it is possible to obtain the effects similar to the foregoing effects. Also, this can be applied to a device referred to as a POD type in which the propeller is driven by a small motor. Also, in the first embodiment, much more of the plurality of flat planes and/or curvatures can be used to form the stern structure for enclosing the propeller shaft tubes. Moreover, the three or more bracket fins can be used to support the propeller shaft tube. Then, moreover, they can be also combined. Also, the techniques in the respective embodiments can be applied to each other, unless any technical conflict occurs.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

This application is based upon and claims the benefit of priority from Japanese patent application No. 2009-254297 filed on Nov. 5, 2009, the disclosure of which is incorporated herein in its entirety by reference.

The invention claimed is:

1. A stern structure of a ship, comprising:
   a plurality of propellers;
   a plurality of propeller shafts configured so as to correspond to the plurality of propellers, the plurality of propeller shafts being connected to the plurality of propellers, respectively; and
   a stern structural body configured to be joined to a rear part of a stern body, and to contain portions of the plurality of propeller shafts extending backwardly from the stern body,
   wherein an inner side of the stern structural body is equivalent to an interior portion of a ship body,
   wherein the stern structural body supports the plurality of propeller shafts in the interior portion of the ship body,
   wherein the stern structural body includes
      a top surface portion configured so as to extend backwardly from the stern body, to spread externally with respect to the ship body center line and to cover an upper portion of one of the propeller shafts,
      a bottom surface portion configured so as to extend backwardly from the stern body, to spread externally with respect to the ship body center line and to cover a lower portion of the one of the propeller shafts, and
      a side portion configured so as to extend backwardly from the stern body and to cover a side portion of the one of the propeller shafts, the side portion being joined to the top surface portion and the bottom surface portion,
   wherein the top surface portion includes a first curvature portion which configures a curvature such that the stern body and the side portion are continuously and smoothly joined on a top side, and
   wherein the bottom surface portion includes a second curvature portion which configures a curvature such that the stern body and the side portion are continuously and smoothly joined on a bottom side.

2. The stern structure of the ship according to claim 1, wherein the stern body has a stern structure of a single-screw ship type.

3. A stern structure of a ship, comprising:
   a plurality of propellers;
   a plurality of propeller shafts configured so as to correspond to the plurality of propellers, the plurality of propeller shafts being connected to the plurality of propellers, respectively; and
   a stern structural body configured to be joined to a rear part of a stern body, and to contain portions of the plurality of propeller shafts extending backwardly from the stern body,
   wherein an inner side of the stern structural body is equivalent to an interior portion of a ship body,
   wherein the stern structural body supports the plurality of propeller shafts in the interior portion of the ship body,
   wherein the stern structural body includes
      a top surface portion configured so as to extend backwardly from the stern body, to spread externally with respect to the ship body center line and to cover an upper portion of one of the propeller shafts,
      a bottom surface portion configured so as to extend backwardly from the stern body, to spread externally with respect to the ship body center line and to cover a lower portion of the one of the propeller shafts, and a side portion configured so as to extend backwardly from the stern body and to cover a side portion of the one of the propeller shafts, the side portion being joined to the top surface portion and the bottom surface portion, wherein the top surface portion includes a first flat portion which configures a flat plane such that the stern body and the side portion are continuously joined on a top side, and wherein the bottom surface portion includes a second flat portion which configures a flat plane such that the stern body and the side portion are continuously joined on a bottom side.

4. The stern structure of the ship according to claim 3, wherein the stern body has a stern structure of a single-screw ship type.

5. A stern structure of a ship, comprising:
a plurality of propellers;
a plurality of propeller shaft tubes configured so as to correspond to the plurality of propellers, respectively;
a plurality of propeller shafts connected to the plurality of propellers, respectively, the plurality of propeller shafts being inserted into the plurality of propeller shaft tubes, respectively; and
a stern structural body configured to be joined to a rear part of a stern body, and to support portions of the plurality of propeller shafts tubes extending backwardly from the stern body,
wherein the stern structural body includes
a side fin configured so as to extend backwardly from a position where one of the propeller shaft tubes protrudes from the stern body, so as to extend along the one of the propeller shaft tubes, and so as to spread externally with respect to the ship body center line, the side fin being joined to a side portion of the one of the propeller shaft tubes so as to support the one of the propeller shaft tubes, and
an upper fin provided separately at a rear of the stern body, the upper fin being configured so as to extend downwardly from a bottom of the stern body, the upper fin being joined to an upper portion of the one of the propeller shaft tubes so as to support the one of the propeller shaft tubes,
wherein the side fin and the upper fin are joined to the stern body to coincide with directions of stream lines around the ship body.

6. The stern structure of the ship according to claim 5, wherein the stern body has a stern structure of a single-screw ship type.

7. A ship comprising:
a stern structure of a ship, wherein said stern structure of said ship includes
a plurality of propellers,
a plurality of propeller shafts configured so as to correspond to the plurality of propellers, the plurality of propeller shafts being connected to the plurality of propellers, respectively, and
a stern structural body configured to be joined to a rear part of a stern body, and to contain portions of the plurality of propeller shafts extending backwardly from the stern body,
wherein an inner side of the stern structural body is equivalent to an interior portion of a ship body,
wherein the stern structural body supports the plurality of propeller shafts in the interior portion of the ship body,
wherein the stern structural body includes
a top surface portion configured to extend backwardly from the stern body, to spread externally with respect to the ship body center line and to cover an upper portion of one of the propeller shafts,
a bottom surface portion configured to extend backwardly from the stern body, to spread externally with respect to the ship body center line and to cover a lower portion of the one of the propeller shafts, and
a side portion configured to extend backwardly from the stern body and to cover a side portion of the one of the propeller shafts, the side portion being joined to the top surface portion and the bottom surface portion,
wherein the top surface portion includes a first curvature portion which configures a curvature such that the stern body and the side portion are continuously and smoothly joined on a top side, and
wherein the bottom surface portion includes a second curvature portion which configures a curvature such that the stern body and the side portion are continuously and smoothly joined on a bottom side.

8. The ship according to claim 7, wherein the stern body has a stern structure of a single-screw ship type.

9. A ship comprising:
a stern structure of a ship, wherein said stern structure of said ship includes
a plurality of propellers,
a plurality of propeller shafts configured so as to correspond to the plurality of propellers, the plurality of propeller shafts being connected to the plurality of propellers, respectively, and
a stern structural body configured to be joined to a rear part of a stern body, and to contain portions of the plurality of propeller shafts extending backwardly from the stern body,
wherein an inner side of the stern structural body is equivalent to an interior portion of a ship body,
wherein the stern structural body supports the plurality of propeller shafts in the interior portion of the ship body,
wherein the stern structural body includes
a top surface portion configured to extend backwardly from the stern body, to spread externally with respect to the ship body center line and to cover an upper portion of one of the propeller shafts,
a bottom surface portion configured to extend backwardly from the stern body, to spread externally with respect to the ship body center line and to cover a lower portion of the one of the propeller shafts, and
a side portion configured to extend backwardly from the stern body and to cover a side portion of the one of the propeller shafts, the side portion being joined to the top surface portion and the bottom surface portion,
wherein the top surface portion includes a first flat portion which configures a flat plane such that the stern body and the side portion are continuously joined on a top side, and
wherein the bottom surface portion includes a second flat portion which configures a flat plane such that the stern body and the side portion are continuously joined on a bottom side.

10. The stern structure of the ship according to claim 9, wherein the stern body has a stern structure of a single-screw ship type.

11. A ship comprising:
a stern structure of a ship, wherein said stern structure of said ship includes
a plurality of propellers, a plurality of propeller shaft tubes configured so as to correspond to the plurality of propellers, respectively, a plurality of propeller shafts connected to the plurality of propellers, respectively, the plurality of propeller shafts being inserted into the plurality of propeller shaft tubes, respectively, and a stern structural body configured to be joined to a rear part of a stern body, and to support portions of the plurality of propeller shafts tubes extending backwardly from the stern body, wherein the stern structural body includes a side fin configured so as to extend backwardly from a position where one of the propeller shaft tubes protrudes from the stern body, so as to extend along the one of the propeller shaft tubes, and so as to spread externally with respect to the ship body center line, the side fin being joined to a side portion of the one of the propeller shaft tubes so as to support the one of the propeller shaft tubes, and an upper fin provided separately at a rear of the stern body, the upper fin being configured so as to extend downwardly from a bottom of the stern body, the upper fin being joined to an upper portion of the one of the propeller shaft tubes so as to support the one of the propeller shaft tubes, wherein the side fin and the upper fin are joined to the stern body to coincide with directions of stream lines around the ship body.

12. The ship according to claim 11, wherein the stern body has a stern structure of a single-screw ship type.

13. A stern structure of a ship, comprising:

a plurality of propellers;

a plurality of propeller shafts configured so as to correspond to the plurality of propellers, the plurality of propeller shafts being connected to the plurality of propellers, respectively; and a stern structural body configured to be joined to a rear part of a stern body, and to contain portions of the plurality of propeller shafts extending backwardly from the stern body, wherein an inner side of the stern structural body is equivalent to an interior portion of a ship body, wherein the stern structural body supports the plurality of propeller shafts in the interior portion of the ship body, wherein the stern structural body includes a top surface portion configured so as to extend backwardly from the stern body, to spread externally with respect to the ship body center line and to cover an upper portion of one of the propeller shafts, a bottom surface portion configured so as to extend backwardly from the stern body, to spread externally with respect to the ship body center line and to cover a lower portion of the one of the propeller shafts, and a side portion configured so as to extend backwardly from the stern body and to cover a side portion of the one of the propeller shafts, the side portion being joined to the top surface portion and the bottom surface portion, wherein the top surface portion includes a first flat portion which configures a flat plane such that the stern body and the side portion are continuously joined on a top side, and wherein the bottom surface portion includes a first curvature portion which configures a curvature such that the stern body and the side portion are continuously and smoothly joined on a bottom side.

14. A ship comprising:

a stern structure of a ship, wherein said stern structure of said ship includes a plurality of propellers, a plurality of propeller shafts configured so as to correspond to the plurality of propellers, the plurality of propeller shafts being connected to the plurality of propellers, respectively, and a stern structural body configured to be joined to a rear part of a stern body, and to contain portions of the plurality of propeller shafts extending backwardly from the stern body, wherein an inner side of the stern structural body is equivalent to an interior portion of a ship body, wherein the stern structural body supports the plurality of propeller shafts in the interior portion of the ship body, wherein the stern structural body includes a top surface portion configured to extend backwardly from the stern body, to spread externally with respect to the ship body center line and to cover an upper portion of one of the propeller shafts, a bottom surface portion configured to extend backwardly from the stern body, to spread externally with respect to the ship body center line and to cover a lower portion of the one of the propeller shafts, and a side portion configured to extend backwardly from the stern body and to cover a side portion of the one of the propeller shafts, the side portion being joined to the top surface portion and the bottom surface portion, wherein the top surface portion includes a first flat portion which configures a flat plane such that the stern body and the side portion are continuously joined on a top side, and wherein the bottom surface portion includes a first curvature portion which configures a curvature such that the stern body and the side portion are continuously and smoothly joined on a bottom side.

* * * * *